United States Patent
Shepelev et al.

(10) Patent No.: US 10,175,824 B2
(45) Date of Patent: Jan. 8, 2019

(54) INTERFERENCE MITIGATION AND CLOCK DITHERING FOR A CONTINUOUS-TIME RECEIVER FOR CAPACITIVE SENSING

(71) Applicant: SYNAPTICS INCORPORATED, San Jose, CA (US)

(72) Inventors: Petr Shepelev, Campbell, CA (US); Steve Chikin Lo, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 24 days.

(21) Appl. No.: 15/620,429

(22) Filed: Jun. 12, 2017

(65) Prior Publication Data
US 2018/0356936 A1 Dec. 13, 2018

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC .................................. G06F 3/044; G06F 3/0418
See application file for complete search history.

(56) References Cited

U.S. PATENT DOCUMENTS

2014/0049266 A1* 2/2014 Heim .................. G01R 35/005
 324/603
2016/0018867 A1* 1/2016 Nys .................... G01R 27/2605
 324/674

* cited by examiner

*Primary Examiner* — Kevin M Nguyen
(74) *Attorney, Agent, or Firm* — Patterson + Sheridan, LLP

(57) ABSTRACT

Embodiments herein describe input devices that include receivers for sampling capacitive sensing signals that perform continuous-time demodulation. An input device is provided that includes a plurality of sensor electrodes in a sensing region of the input device and a processing system coupled to the plurality of sensor electrodes and configured to generate a first measurement of a capacitive sensing signal acquired using a first sensor electrode of the plurality of sensor electrodes during a first time period, that comprises effects of a first modulated signal driven onto at least one of the plurality of sensor electrodes, the first measurement generated at a first sensing frequency based on a clock signal; periodically dither the clock signal; and adjust a demodulation frequency based on the dithered clock signal to generate a second measurement of the capacitive sensing signal during a second time period at the first sensing frequency based on the dithered clock signal.

18 Claims, 5 Drawing Sheets

INTERFERENCE MITIGATION AND CLOCK DITHERING FOR A CONTINUOUS-TIME RECEIVER FOR CAPACITIVE SENSING

BACKGROUND

Field of the Disclosure

This disclosure generally relates to electronic devices and, more specifically, to interference mitigation and clock dithering for a continuous-time receiver for capacitive sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY

This disclosure generally provides input devices, processing systems and methods for interference mitigation and clock dithering for a continuous-time receiver for capacitive sensing. Techniques herein allow for clock dithering of the continuous-time receiver for reducing electromagnetic emissions (EMI) while also mitigating interference of touch sensing due to changing sensing frequencies by adjusting the receiver configuration to adjust the demodulation frequency each time the clock changes by the clock dithering, such that the sensing frequency is constant.

One embodiment described herein is an input device that includes a plurality of sensor electrodes in a sensing region of the input device and a processing system coupled to the plurality of sensor electrodes. The processing system is configured to generate a first measurement of a capacitive sensing signal acquired using a first sensor electrode of the plurality of sensor electrodes during a first time period, wherein the capacitive sensing signal comprises effects of a first modulated signal driven onto at least one of the plurality of sensor electrodes, and wherein the first measurement is generated at a first sensing frequency based on a clock signal. The processing system is configured to periodically dither the clock signal. The processing system is configured to adjust a demodulation frequency based on the dithered clock signal to generate a second measurement of the capacitive sensing signal acquired using the first sensor electrode during a second time period at the first sensing frequency based on the dithered clock signal.

Another embodiment described herein is a method of capacitive sensing. The method includes driving a first modulated signal onto at least one of a plurality of sensor electrodes to acquire a capacitive sensing signal, wherein the capacitive sensing signal comprises effects of the first modulated signal on the at least one sensor electrodes and generating a first measurement of the capacitive sensing signal during a first time period, and wherein the first measurement is generated at a first sensing frequency based on a clock signal. The method includes dithering the clock signal and adjusting a demodulation frequency based on the dithered clock signal to generate a second measurement of the capacitive sensing signal during a second time period at the first sensing frequency based on the dithered clock signal.

Yet another embodiment described herein is a processing system for an input device. The processing system includes sensor circuitry configured to drive a first modulated signal onto at least one of a plurality of sensor electrodes to acquire a capacitive sensing signal, wherein the capacitive sensing signal comprises effects of the first modulated signal on the at least one sensor electrodes. The processing system includes a clock generator module configured to generate a clock signal. The processing system includes a determination module configured to generate a first measurement of the capacitive sensing signal during a first time period, wherein the first measurement is generated at a first sensing frequency based on the clock signal. The clock generator module is configured to dither the clock signal. The determination module is configured to adjust a demodulation frequency based on the dithered clock signal to generate a second measurement of the capacitive sensing signal during a second time period at the first sensing frequency based on the dithered clock signal.

BRIEF DESCRIPTION OF DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

Figure 1:
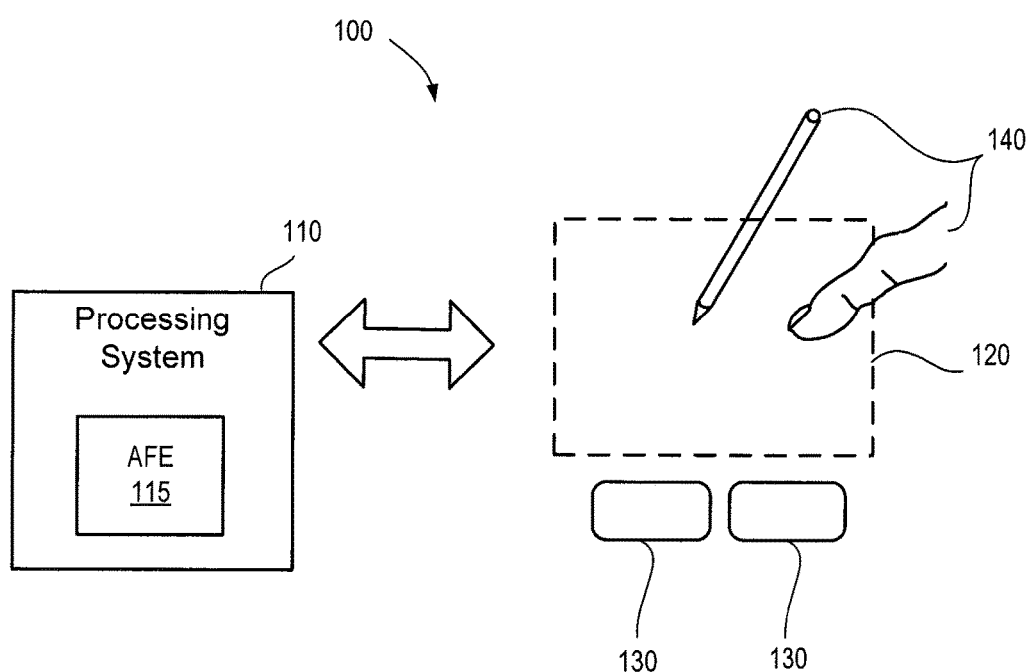
FIG. 1 is a block diagram of an exemplary system that includes an input device in accordance with embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Aspects herein describe input devices that include continuous-time receivers (e.g., sigma-delta analog-front-ends (AFEs)) for sampling capacitive sensing signals. In certain aspects, the continuous-time receivers perform continuous demodulation. One advantage of using continuous demodulation is that functions in the receiver performed using analog components can be replaced by digital logic. For example, instead of including large capacitors for performing low pass filtering, this filtering can be performed by digital logic thereby reducing the size, cost, and/or power consumption of the receivers.

However, one disadvantage of using continuous-time receivers is that electromagnetic emissions (EMI) from such receivers may be significantly higher as compared to EMI from traditional AFEs. The higher EMI for continuous-time receivers may be a result of the receiver running continuously at a high clock rate while sensing and/or because the continuous-time AFEs include more digital hardware than the traditional AFEs.

Clock-dithering can be used to reduce the EMI. Clock-dithering spreads the frequency spectrum of the clock signal. Generally, dithering the clock signal means changing its duty cycle which increases and/or decreases the frequency of the clock and its derived signals. However, dithering the clock signal can degrade interference mitigation and/or signal-to-noise ratio (SNR) performance of the receiver because of the varying sensing frequencies.

As described in more detail below, aspects of the present disclose provide for dithering of the clock for a continuous-time receiver, for example at burst boundaries or sensing half-period boundaries, and adjusting the demodulation frequency configuration of the receiver each time the clock changes such that the sensing frequency is constant throughout the clock-dithering. Thereby, EMI can be reduced by using the clock-dithering while interference mitigation and SNR performance can be maintained by adjusting the demodulation frequency.

Turning now to the figures, FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As shown in FIG. 1, the processing system 110 includes the continuous-time AFE 115. The continuous-time AFE 115 may be operated according the techniques discussed in further detail herein. For example, the continuous-time AFE 115 may use clock-dithering at burst and/or sensing half-period boundaries. The demodulation configuration of the continuous-time AFE 115 may be adjusted when the clock changes, such that the sensing frequency remains constant.

Figure 2:
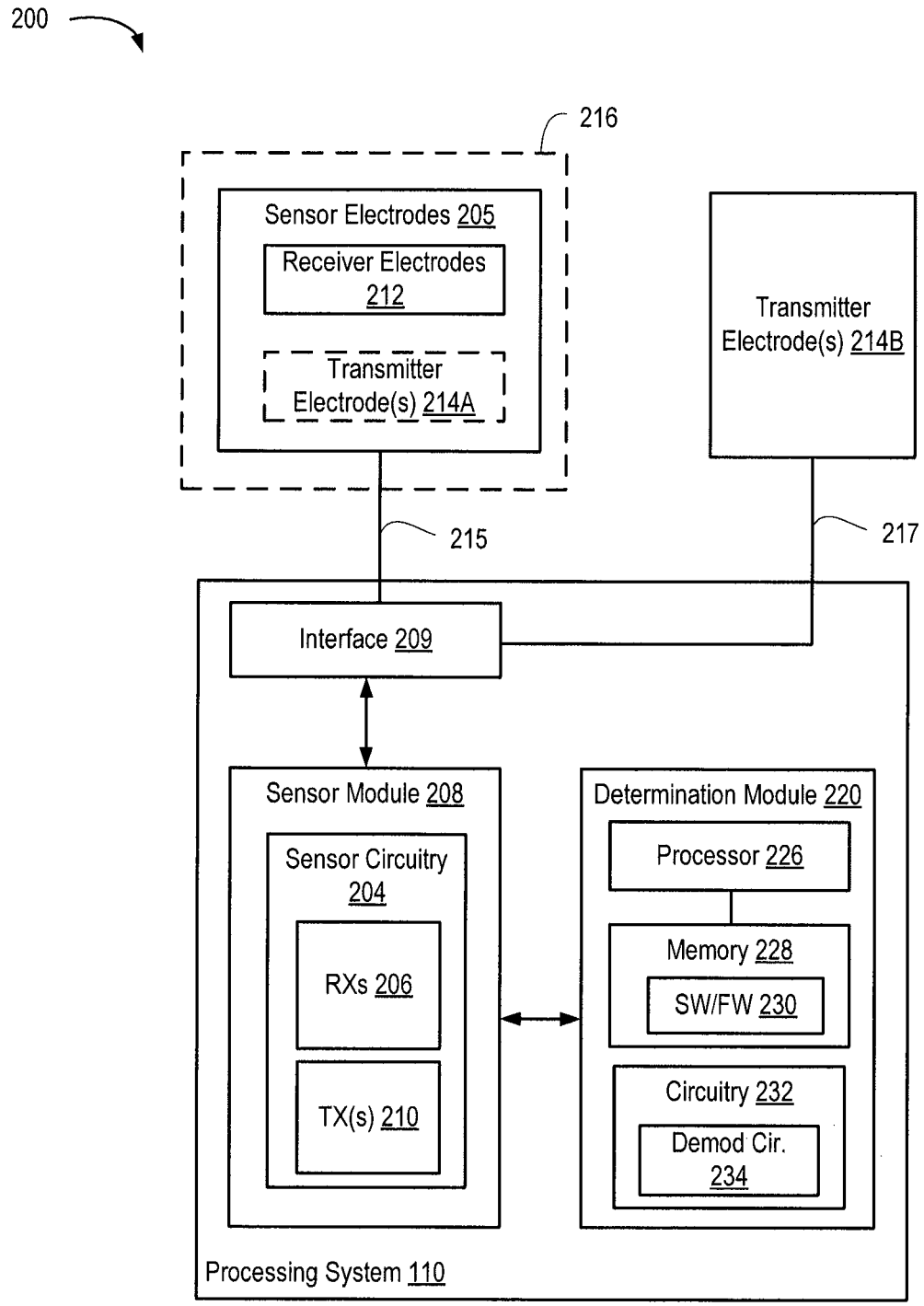
FIG. 2 illustrates portions of exemplary patterns of capacitive sensing pixels in accordance with embodiments described herein.

FIG. 2 is a block diagram depicting a capacitive sensing device 200 of the input device 100 according to some embodiments. The capacitive sensing device 200 includes a plurality of sensor electrodes 205. The sensor electrodes 205 are disposed in the sensing region 120 of the input device 100 (FIG. 1) and can be arranged in various patterns, such as a bars and stripes pattern, a matrix pattern (e.g., an array of rectangles), or the like. During transcapacitive sensing, the sensor electrodes 205 include a plurality of receiver electrodes 212. In some embodiments, the sensor electrodes 205 include one or more transmitter electrodes 214A. In other embodiments, the capacitive sensing device 200 can include one or more transmitter electrodes 214B separate from the sensor electrodes 205. The sensor electrodes 205 are coupled to the processing system 110 through routing traces 215. If present, the transmitter electrode(s) 214B is/are coupled to the processing system 110 by electrical connection(s) 217. The transmitter electrode(s) 214A and the transmitter electrode(s) 214B are generally referred to as transmitter electrode(s) 214.

The sensor electrodes 205 can be formed on one or more substrates 216. In some touch screen embodiments, all or a portion of the sensor electrodes 202 are display electrodes of a display panel used in updating a display, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-Domain Vertical Alignment (MVA)), over an emissive layer (OLED), etc. The display electrodes can also be referred to as "common electrodes," since the display electrodes perform functions of display updating and capacitive sensing.

The receiver electrodes 212 form areas of localized capacitive couplings with the transmitter electrode(s) 214 referred to as transcapacitances. The transcapacitances form "capacitive pixels" of a "capacitive image" (also referred to as a "capacitive frame"). The transcapacitances between the receiver electrodes 212 and the transmitter electrode(s) 214 change with the proximity and motion of input object(s) in the sensing region 120 (i.e., the capacitive pixel values can change from one capacitive image to the next based on presence of input object(s)).

In an embodiment, the processing system 110 includes a sensor module 208 and a determination module 220. The sensor module 208 includes sensor circuitry 204 that operates the sensor electrodes 205 to receive resulting signals. The sensor module 208 is coupled to the sensor electrodes 205 and the transmitter electrode(s) 214B (if present) through an interface 209. The interface 209 can include various switches, multiplexers, and the like that couple the sensor circuitry 204 to the sensor electrodes 205 and the transmitter electrode(s) 214B (if present). The sensor circuitry 204 can include a plurality of receivers (RXs) 206 and one or more transmitters (TX(s)) 210. The transmitter(s) 210 are configured to couple modulated signal(s) to the transmitter electrodes 214 through the interface 209. The receivers 206 are configured to receive resulting signals from the receiver electrodes 212.

The determination module 220 is coupled to the sensor module 208. The determination module 220 is configured to determine capacitive measurements from the resulting signals received by the sensor circuitry 204. The determination module 220 can also determine position information for input object(s) from the capacitive measurements. In an embodiment, the determination module 220 includes processor circuitry 226, such as a digital signal processor (DSP), microprocessor, or the like. The determination module 220 can include memory 228 configured to store software and/or firmware (SW/FW 230) configured for execution by processor circuitry 226 to implement various functions. Alternatively, some or all of the functions of the determination module 220 can be implemented entirely in hardware (e.g., using circuitry 232). The processing system 110 can include other modular configurations, and the functions performed by the sensor module 208 and the determination module 220 can, in general, be performed by one or more modules or circuits in the processing system 110. In an embodiment, the circuitry 232 includes demodulation circuitry 234. The demodulation circuitry 234 demodulates and filters the resulting signals received by the sensor circuitry 204. The demodulation circuitry 234 is discussed further below.

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules, such as a display driver module.

In aspects, the receiver(s) 206 may be continuous-time receivers such as the continuous-time AFE 115 shown in FIG. 1. The receiver(s) 206 may be configured to perform the techniques described herein for clock-dithering and interference mitigation by dynamically adjusting the demodulation hardware configuration to match or maintain a constant sensing frequency.

Figure 3:
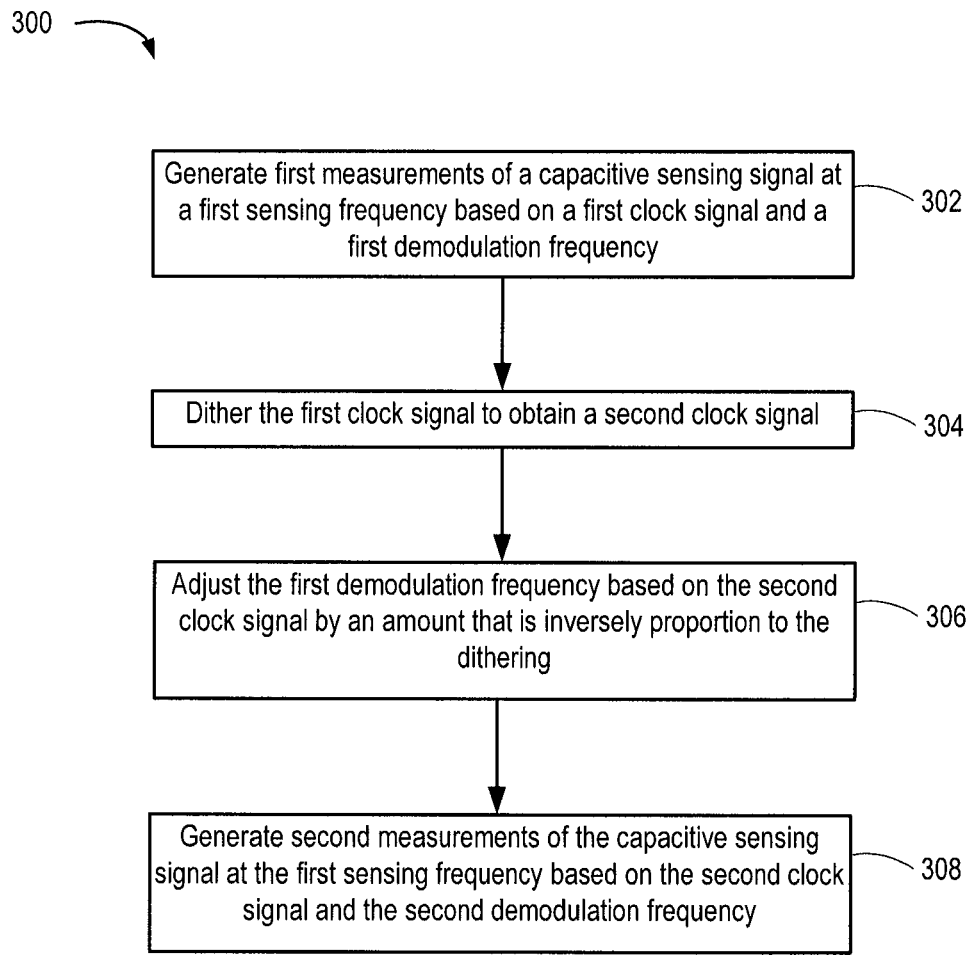
FIG. 3 is a flow chart for generating a capacitive sensing measurement using clock-dithering and interference mitigation in accordance with embodiments described herein.

FIG. 3 is a flow chart of a method 300 for generating a capacitive sensing measurement using continuous-time demodulation with clock-dithering and interference mitigation, in accordance with embodiments described herein. For clarity, the blocks in method 300 are discussed in parallel to FIG. 4 which illustrates in more detail the receiver 206 of FIG. 2 in accordance with an embodiment described herein.

Figure 4:
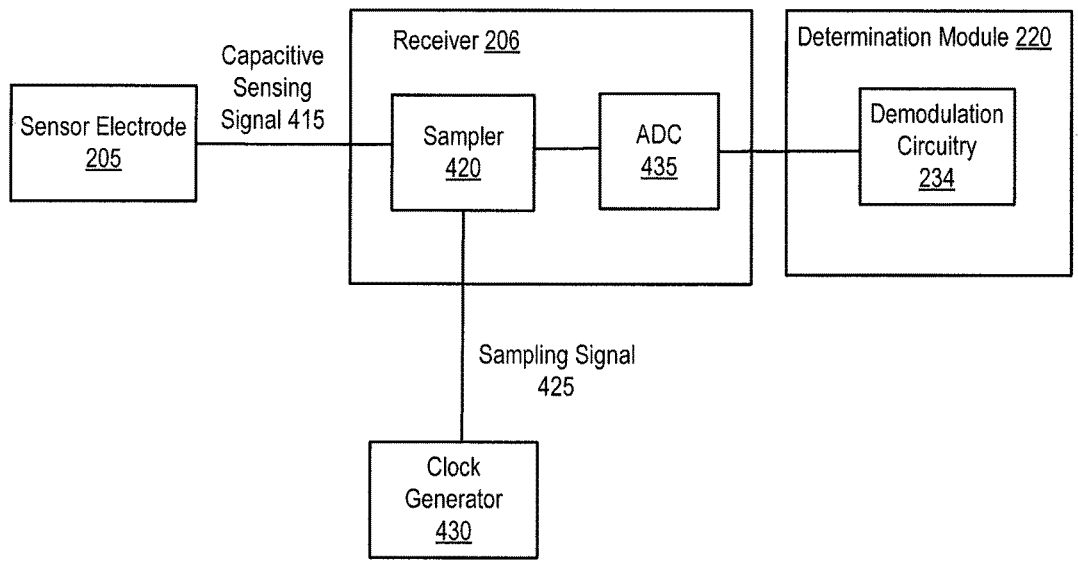
FIG. 4 is a continuous-time receiver for generating a capacitive sensing measurement using clock-dithering and interference mitigation in accordance with embodiments described herein.

FIG. 4 illustrates a portion of the processing system 110 according to embodiments of the present disclosure. Although not shown in FIG. 4, a modulated signal is driven on a sensor electrode 205 (which may be a sensor electrode for absolute capacitance sensing or transmitter electrode for transcapacitance sensing) which results in the capacitive sensing signal 415 which is received (e.g., via the sensor electrode for absolute capacitance sensing or via a receiver electrode for transcapacitance sensing) at the receiver 206. As described above, receiver 206 may be included in processing system 110. Receiver 206 can be a continuous-time receiver configured for continuous demodulation of received sensing signals 415 during sensing periods.

Although in FIG. 4, one receiver 206 and one sensor electrode 205 are illustrated, in various embodiments, the processing system 110 can include multiple receivers, which can also be continuous-time receivers or can be traditional AFEs, and the receivers can receive capacitive sensing signals from multiple sensor electrodes.

As shown in FIG. 4, the receiver 206 includes a sampler 420. Although not shown in FIG. 4, in aspects, the sampler 420 may include a charge measurement circuit electrically coupled to the sensor electrode 205, such as a charge integration circuit, current conveyer, or the like that is configured to measure a change in capacitive charge on the sensor electrode 206. The sampler 420 outputs an analog signal indicative of the capacitive charge.

The method 300 may begin, at 302, by generating a first measurement of a capacitive sensing signal at a first sensing frequency based on a first clock signal and a first demodulation frequency.

The sampler 420 may sample the sensing signal 415 based on sampling signal 425. The sampling signal 425 is a timing signal (e.g., a clock signal CLK) generated in the processing system 110 by the clock generator 430. The sampling signal 425 instructs the sampler 420 when to capture a capacitive sensing measurement (or sample) of the capacitive sensing signal 415. In other words, the sensing frequency of the receiver 206 may be controlled by sampling signal 425. Although not shown, the clock generator 430 may receive a reference clock from another component in the processing system 110 or from a separate component in the electronic device in order to generate the sampling signal 425.

As shown in FIG. 4, the receiver 206 includes an analog-to-digital converter (ADC) 435, such as a high-speed, sigma-delta ADC, coupled to an output of the sampler 420. The ADC 435 converts the analog signal output by the sampler 420 to a digital representation of the measurements by the sampler 420. The output of the ADC 435 can be used by the processing system 110 to determine the location of the input object 140 based on the sampling the capacitive sensing signal 415. For example, the digital signal can be output by the ADC 435 for processing by demodulation circuitry 234 and determination module 220.

Although not shown in FIG. 4, the demodulation circuitry 234 may include digital demodulator(s) and digital filter(s). The digital demodulator(s) can be configured to combine the resulting digital signal with a selected demodulating signal to generate a demodulated signal. The digital filters filter the demodulated signals, which are processed by the determination module to determine changes in capacitance and position information.

Figure 5:
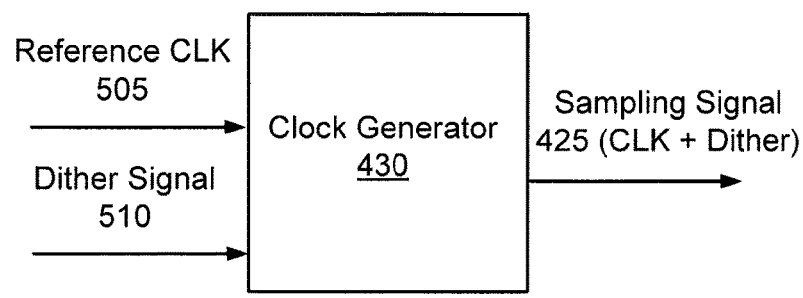
FIG. 5 illustrates using a clock in an input device with dithering in accordance with embodiments described herein.
Figure 5A:
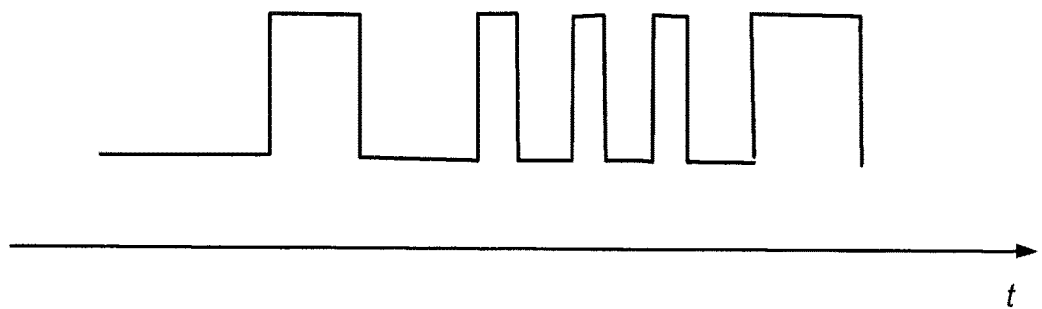
FIG. 5A illustrating a clock signal with dithering generated according to FIG. 5 in accordance with embodiments described herein.

The method 300 may continue, at 304, by dithering the first clock signal to obtain a second clock signal. According to certain aspects, clock-dithering can be used to vary the sampling signal 425 in order to reduce electromagnetic transmission (EMI) of the continuous-time receiver 206. For example, the clock generator 430 changes the sampling signal 425 to perform clock-dithering. FIG. 5 illustrates one example of the clock generator 430 using clock-dithering in accordance with embodiments of the disclosure. As shown in FIG. 5, the clock generator 430 can receive (or generate) a reference CLK 505 as an input. In one example, the reference CLK 505 may be generated by a host CPU or a clock oscillator.

In addition to receiving (or generating) the reference CLK 505, the clock generator 430 can receive (or generate) a dither signal 510 which controls how the clock generator 430 changes the output sampling signal 425. As shown in FIG. 5, the duty cycle of the sampling signal 425 varies over time.

According to certain aspects, the clock-dithering can be performed at burst boundaries (e.g., where the sampling signal 425 is changed at each burst boundary) or at sensing half-period boundaries (e.g., where the sampling signal 425 is changed at each sensing half-period boundary). A burst (also referred to as a capacitive sensing burst) is a sequence of periods (e.g., a number of cycles) of a driving (e.g., modulated) signal (e.g., for driving the sensor electrode 205 for capacitive sensing) used to generate a single measurement for a capacitive node or sensor electrode in the sensing region. Samples from the burst are taken by the AFE and filtered together to produce a single ADC value reported from the AFE. For example, the sensor circuitry 204 includes a transmitter module 210 including circuitry configured to drive a transmitter signal onto the sensor electrodes during periods in which input sensing is desired. The transmitter signal is generally modulated and contains one or more bursts over a period of time allocated for input sensing. The sensing half-period may correspond to the half period of the sensing waveform (e.g., the driving voltage modulation waveform). A sensing half-period may have the same polarity of modulation and the polarity can be changed in the next sensing half-period. Performing the clock-dithering may spread the sampling times/frequency over time, and, thereby reduce the EMI.

The method 300 may continue, at block 306, by adjusting the first demodulation frequency based on the second clock signal by an amount that is inversely proportional to a value of the dithering and, at block 308, by generating a second measurement of the capacitive sensing signal at the first sensing frequency based on the second clock signal and the second demodulation frequency.

According to certain aspects, in order to mitigate (e.g., reduce or eliminate) interference/noise due to using different sensing frequencies for different bursts or sensing half-period boundaries, the configuration of the receiver 206 can be changed when the clock changes in order to maintain a constant (e.g., substantially constant or approximately constant) sensing frequency. The hardware (e.g., a subset of hardware)/firmware configuration of the continuous-time receiver 206 can be adjusted to change settings for the demodulation frequency of the continuous-time receiver 206. In one example, if the sampling signal 425 is adjusted by a coefficient K (e.g., a value of the clock dithering), then the settings/configuration of the continuous-time receiver 206 can be changed to adjust the demodulation frequency by a 1/K. Thus, the frequency of the sigma-delta ADC is constant within the half-sensing period or the burst.

According to certain aspects, the change of configuration for the continuous-time receiver 206 at burst boundaries can be implemented in firmware alone. The change of configuration for the continuous-time receiver 206 on periods of shorter than burst, such as at sensing half-periods, may implemented using additional digital logic. For example, the additional digital logic may be used to fetch, from a programmable array, the next set of settings to apply to the continuous-time receiver 206 registers, along with the clock for the clock-dithering.

Thus, a bandwidth of a digital low-pass filter (LPF) in the continuous-time receiver 206 and a frequency of sensing from a sensor electrode 206 will stay independent from the clock-dithering. This will allow spreading EMI without trading off an SNR and interference/noise mitigation capabilities for touch sensing using a continuous-time receiver.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
   a plurality of sensor electrodes in a sensing region of the input device; and
   a processing system coupled to the plurality of sensor electrodes, the processing system configured to:
      generate a first measurement of a capacitive sensing signal acquired using a first sensor electrode of the plurality of sensor electrodes during a first time period, wherein the capacitive sensing signal comprises effects of a first modulated signal driven onto at least one of the plurality of sensor electrodes, and wherein the first measurement is generated at a first sensing frequency based on a clock signal;
      dither the clock signal; and
      adjust a demodulation frequency based on the dithered clock signal to generate a second measurement of the capacitive sensing signal acquired using the first sensor electrode during a second time period at the first sensing frequency based on the dithered clock signal.

2. The input device of claim 1, wherein the processing system includes a continuous-time receiver for generating the first and second measurements.

3. The input device of claim 1, wherein the processing system is configured to dither the clock signal at every sensing burst or every sensing half-period.

4. The input device of claim 1, wherein the processing system is configured to adjust the demodulation frequency by an amount that is inversely proportional to a value of the clock dithering.

5. The input device of claim 1, wherein the processing system is configured to adjust the demodulation frequency by adjusting at least one of: a hardware or firmware configuration of the processing system.

6. The input device of claim 1, wherein the processing system is configured to determine a clock dithering frequency, a value of the clock dithering, and the demodulation frequency adjustment by fetching a stored configuration indicating the clock dithering frequency, the value of the clock dithering, and the demodulation frequency adjustment.

7. A method of capacitive sensing, comprising:
   driving a first modulated signal onto at least one of a plurality of sensor electrodes to acquire a capacitive sensing signal, wherein the capacitive sensing signal comprises effects of the first modulated signal on the at least one sensor electrode;
   generating a first measurement of the capacitive sensing signal during a first time period, and wherein the first measurement is generated at a first sensing frequency based on a clock signal;
   dithering the clock signal; and
   adjusting a demodulation frequency based on the dithered clock signal to generate a second measurement of the capacitive sensing signal during a second time period at the first sensing frequency based on the dithered clock signal.

8. The method of claim 7, wherein the demodulation comprises continuous-time demodulation.

9. The method of claim 7, wherein the dithering is performed at every sensing burst or every sensing half-period.

10. The method of claim 7, wherein the demodulation frequency is adjusted by an amount that is inversely proportional to a value of the clock dithering.

11. The method of claim 7, wherein adjusting the demodulation frequency comprises adjusting at least one of: a hardware or firmware configuration of an input device.

12. The method of claim 7, further comprising:
determining a clock dithering frequency, a value of the clock dithering, and the demodulation frequency adjustment by fetching a stored configuration indicating the clock dithering frequency, the value of the clock dithering, and the demodulation frequency adjustment.

13. A processing system for an input device, comprising:
sensor circuitry configured to drive a first modulated signal onto at least one sensor electrode of a plurality of sensor electrodes to acquire a capacitive sensing signal, wherein the capacitive sensing signal comprises effects of the first modulated signal on the at least one sensor electrodes;
a clock generator module configured to generate a clock signal; and
a determination module configured to generate a first measurement of the capacitive sensing signal during a first time period, wherein the first measurement is generated at a first sensing frequency based on the clock signal;
wherein the clock generator module is configured to dither the clock signal; and
wherein the determination module is configured to adjust a demodulation frequency based on the dithered clock signal to generate a second measurement of the capacitive sensing signal during a second time period at the first sensing frequency based on the dithered clock signal.

14. The processing system of claim 13, wherein the determination module comprises demodulation circuitry configured to perform continuous-time demodulation of the capacitive sensing signal.

15. The processing system of claim 13, wherein the clock generator module is configured to dither the clock signal at every sensing burst or every sensing half-period.

16. The processing system of claim 13, wherein the demodulation frequency is adjusted by an amount that is inversely proportional to a value of the clock dithering.

17. The processing system of claim 13, wherein the determination module is configured to adjust the demodulation frequency by adjusting at least one of: a hardware or firmware configuration of the processing system.

18. The processing system of claim 13, wherein the determination module is configured to determine a clock dithering frequency, a value of the clock dithering, and the demodulation frequency adjustment by fetching a stored configuration indicating the clock dithering frequency, the value of the clock dithering, and the demodulation frequency adjustment.

* * * * *